US012570294B2

(12) United States Patent
Ueda

(10) Patent No.: US 12,570,294 B2
(45) Date of Patent: Mar. 10, 2026

(54) VEHICLE SPEED ACQUISITION DEVICE AND ABNORMAL NOISE DIAGNOSTIC SYSTEM

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 18/657,979

(22) Filed: May 8, 2024

(65) Prior Publication Data

US 2025/0018955 A1     Jan. 16, 2025

(30) Foreign Application Priority Data

Jul. 14, 2023     (JP) ................................. 2023-116208

(51) Int. Cl.
*B60W 40/105*          (2012.01)
*B60W 50/02*          (2012.01)

(52) U.S. Cl.
CPC ...... *B60W 40/105* (2013.01); *B60W 50/0205* (2013.01); *B60W 2050/021* (2013.01); *B60W 2420/54* (2013.01); *B60W 2520/10* (2013.01); *B60W 2556/20* (2020.02); *B60W 2556/50* (2020.02)

(58) Field of Classification Search
CPC ....... B60W 2050/021; B60W 2420/54; B60W 2520/10; B60W 2556/20; B60W 2556/50; B60W 40/105; B60W 50/0205
See application file for complete search history.

(56) References Cited

U.S. PATENT DOCUMENTS

| | | | | |
|---|---|---|---|---|
| 8,649,529 | B2 * | 2/2014 | Klefenz ................. | G01S 3/809 |
| | | | | 381/92 |
| 9,544,736 | B2 * | 1/2017 | Yang .................... | G01C 21/206 |
| 9,743,202 | B2 * | 8/2017 | Orman ...................... | G01S 5/20 |
| 2020/0204903 | A1 * | 6/2020 | Bayer ...................... | H04R 5/04 |

FOREIGN PATENT DOCUMENTS

| | | | | |
|---|---|---|---|---|
| JP | H06-068374 A | 3/1994 | | |
| JP | H09-005094 A | 1/1997 | | |
| JP | 3039151 B2 * | 5/2000 | | |
| JP | 4972211 B2 | 7/2012 | | |
| WO | WO-2010035339 A1 * | 4/2010 | ....... | G08G 1/096827 |
| WO | WO-2014083607 A1 * | 6/2014 | ............. | G01P 3/481 |

* cited by examiner

*Primary Examiner* — Babar Sarwar
(74) *Attorney, Agent, or Firm* — Oliff PLC

(57) ABSTRACT

The vehicle speed acquisition device of the present disclosure acquires the position information at a predetermined first time interval, acquires the sound pressure of the sound emitted from the vehicle at the second time interval shorter than the first time interval, estimates the vehicle speed at the acquisition timing of the position information and the vehicle speed at the acquisition timing of the sound pressure based on the acquired position information and the first and second time intervals, acquires the estimation accuracy of the vehicle speed based on the change rate of the vehicle speed between the acquisition timings of the position information and the change rate of the sound pressure between the acquisition timings of the sound pressure, and associates the acquired estimation accuracy with the vehicle speed at the acquisition timing of the estimated sound pressure.

5 Claims, 4 Drawing Sheets

FIG. 2

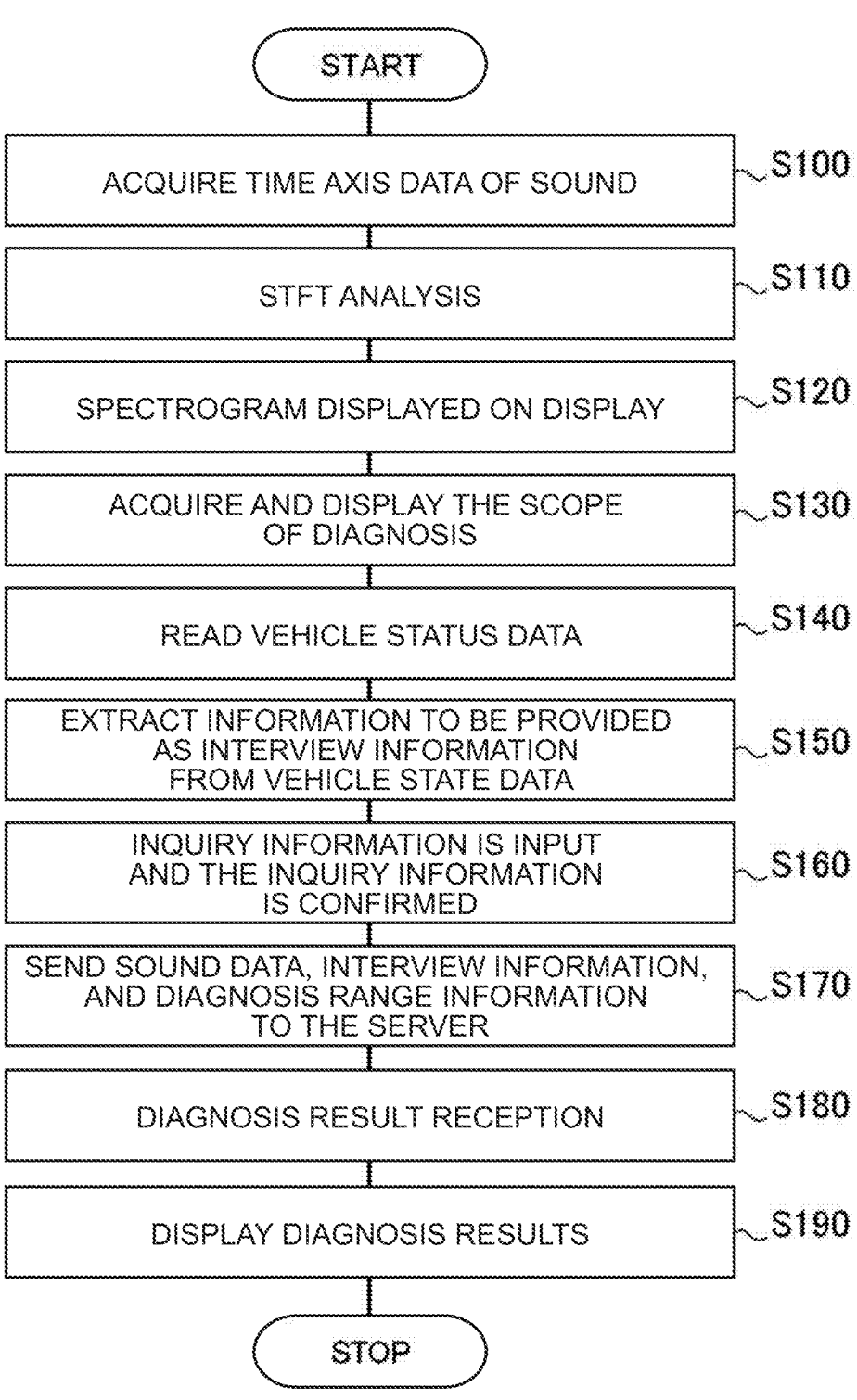

START

ACQUIRE TIME AXIS DATA OF SOUND — S100

STFT ANALYSIS — S110

SPECTROGRAM DISPLAYED ON DISPLAY — S120

ACQUIRE AND DISPLAY THE SCOPE OF DIAGNOSIS — S130

READ VEHICLE STATUS DATA — S140

EXTRACT INFORMATION TO BE PROVIDED AS INTERVIEW INFORMATION FROM VEHICLE STATE DATA — S150

INQUIRY INFORMATION IS INPUT AND THE INQUIRY INFORMATION IS CONFIRMED — S160

SEND SOUND DATA, INTERVIEW INFORMATION, AND DIAGNOSIS RANGE INFORMATION TO THE SERVER — S170

DIAGNOSIS RESULT RECEPTION — S180

DISPLAY DIAGNOSIS RESULTS — S190

STOP

VEHICLE SPEED ACQUISITION DEVICE AND ABNORMAL NOISE DIAGNOSTIC SYSTEM

CROSS-REFERENCE TO RELATED APPLICATION

This application claims priority to Japanese Patent Application No. 2023-116208 filed on Jul. 14, 2023, incorporated herein by reference in its entirety.

BACKGROUND

1. Technical Field

The present disclosure relates to a vehicle speed acquisition device that acquires vehicle speed of a vehicle based on position information of the vehicle, and to an abnormal noise diagnostic system that includes the same.

2. Description of Related Art

Conventionally, an automotive navigation system that detects vehicle speed of a vehicle based on results of reception of radio waves from Global Positioning System (GPS) satellites is known (see, for example, Japanese Patent No. 4972211). This automotive navigation system collects sound at a predetermined position in the vehicle, acquires an inclination angle on a travel route of the vehicle, and extracts characteristic information of sound collection results corresponding to the vehicle speed, for each inclination angle, based on detection results of the vehicle speed and the sound collection results. Further, the automotive navigation system stores collected sound property information, in which the vehicle speed and the characteristic information are associated with each other, by classifying the collected sound characteristic information for each inclination angle, when radio waves cannot be received from a number of GPS satellites necessary for detecting the vehicle speed, and estimates the vehicle speed taking into consideration the sound collection results, the inclination angle of the traveling route, and the collected sound property information.

SUMMARY

However, in the conventional automotive navigation system, when the characteristic information of the sound collection results that is extracted and the inclination angle that is acquired are not included in the collected sound property information, the vehicle speed cannot be estimated. Also, the processing load of extracting the characteristic information of the sound collection results, and generating and classifying the collected sound property information, is in no way small, and moreover, data quantity of the collected sound property information increases along with usage time of the vehicle.

In view of the above, it is an object of the present disclosure to enable acquisition of useful vehicle speed data from the position information of the vehicle and data of sound generated in the vehicle.

A vehicle speed acquisition device according to the present disclosure is a vehicle speed acquisition device that acquires a vehicle speed of a vehicle based on position information of the vehicle, and includes a position information acquisition unit for acquiring the position information at a first time interval that is determined in advance, a sound pressure acquisition unit for acquiring a sound pressure of sound emitted from the vehicle at a second time interval that is shorter than the first time interval, a vehicle speed estimation unit for estimating the vehicle speed at an acquisition timing of the position information and the vehicle speed at an acquisition timing of the sound pressure, based on the position information acquired by the position information acquisition unit and the first and the second time intervals, a vehicle speed change rate acquisition unit for acquiring a change rate of the vehicle speed between acquisition timings of the position information, based on the vehicle speed at the acquisition timing of the position information estimated by the vehicle speed estimation unit, and the first time interval, a sound pressure change rate acquisition unit for acquiring a change rate of the sound pressure between acquisition timings of the sound pressure, based on the sound pressure acquired by the sound pressure acquisition unit, and the second time interval, and an estimation accuracy acquisition unit for acquiring an estimation accuracy of the vehicle speed by the vehicle speed estimation unit, based on the change rate of the vehicle speed and the change rate of the sound pressure, and associating the estimation accuracy that is acquired, with the vehicle speed at the acquisition timing of the sound pressure estimated by the vehicle speed estimation unit.

An abnormal noise diagnostic system according to the present disclosure is an abnormal noise diagnostic system including the above-described vehicle speed acquisition device, a mobile terminal that is configured to acquire the position information and data regarding the sound emitted from the vehicle, and that also includes the vehicle speed acquisition device, and a diagnostic device that is built by machine learning, so as to diagnose an abnormal noise occurring in the vehicle, based on the data of the sound transmitted from the mobile terminal, and the vehicle speed acquired by the vehicle speed acquisition device.

The diagnostic device selects the vehicle speed to be used for diagnosis of the abnormal noise, based on the estimation accuracy associated with the vehicle speed from the mobile terminal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart for explaining an abnormal noise diagnosis procedure by the abnormal noise diagnostic system of the present disclosure;

DETAILED DESCRIPTION OF EMBODIMENTS

Embodiments of the present disclosure will now be described with reference to the drawings.

Figure 1:
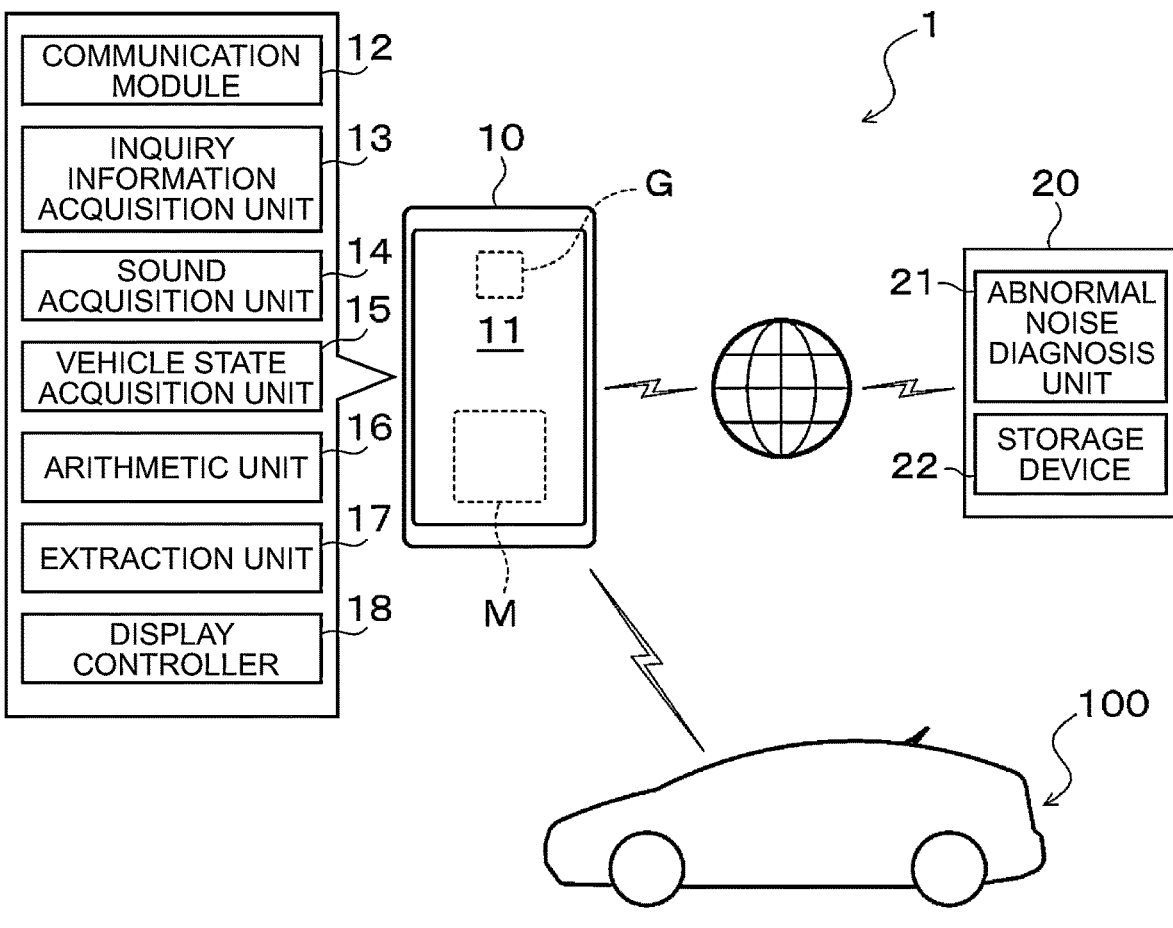
FIG. 1 is a schematic configuration diagram showing an abnormal noise diagnostic system of the present disclosure.

FIG. 1 is a schematic diagram illustrating an abnormal noise diagnostic system 1 according to an embodiment of the present disclosure. The abnormal noise diagnostic system 1 shown in the figure is for diagnosing the reason of abnormal noise generated in the vehicle 100 such as a vehicle equipped with only an engine as a power generation source, hybrid electric vehicle (HEV, PHEV) and battery electric vehicle (BEV, FCEV), and includes a mobile terminal 10 and a server 20 capable of exchanging information with the mobile terminal 10 by communication.

The mobile terminal 10 is used by a worker (a user of the abnormal noise diagnostic system 1) such as a vehicle dealer or a maintenance shop when a response to a user (an owner) of the vehicle 100 in which an abnormal noise has occurred or a reproduction test in which an abnormal noise is reproduced by running (operating) the vehicle 100 on a roadway or a test bench. In the present embodiment, the mobile terminal 10 is a so-called smart phone, and includes a SoC, ROM, RAM, GPS module (position information acquisition unit) G, an auxiliary storage device (flash memory) M, a touch panel type display unit 11, a communication module 12 capable of exchanging various kinds of information with an electronic control device of the server 20 or the vehicle 100 via wired or wireless communication, a microphone (not shown), and the like. An abnormal noise diagnosis support application (program) is installed in the mobile terminal 10. As shown in of FIG. 1, the mobile terminal 10 includes an inquiry information acquisition unit 13, a sound acquisition unit 14, a vehicle state acquisition unit 15, an arithmetic processing unit 16, an extraction unit 17, and a display control unit 18, each of which is constructed by cooperation of an abnormal noise diagnosis support application (software) and hardware such as a SoC of the mobile terminal 10.

The inquiry information acquisition unit 13 acquires, via the display unit 11, information (hereinafter referred to as "inquiry information") indicating a state of the vehicle 100 at the time of occurrence of an abnormal noise provided by a user of the vehicle 100 or the like. The inquiry information includes vehicle identification information including a vehicle identification number (vehicle carriage number) and the like, an order, an occurrence date and time, an occurrence frequency, an occurrence location of an abnormal noise, a type of a sound (a pseudo sound word), a physical quantity that changes when the vehicle 100 travels, such as a vehicle speed, an operating state of the vehicle 100, a warm-up effect in an engine-mounted vehicle, a selection item selected by a driver during driving of the vehicle 100, traveling environment information of the vehicle 100, and the like, and is input by the worker or a user of the vehicle 100. The sound acquisition unit 14 acquires the time axis data of the sound via the microphone when the reproduction test is performed by the operator.

When the reproduction test is performed, the vehicle state acquisition unit 15 acquires information indicating the state of the vehicle 100 (hereinafter, referred to as "vehicle state data") in synchronization with the acquisition of the time axis data of the sound by the sound acquisition unit 14, and executes processing on the acquired vehicle state data. The vehicle condition data includes a plurality of physical quantities, for example, a vehicle speed V, an engine speed Ne, and the like, corresponding to the items of the inquiry information. In the present embodiment, the vehicle state acquisition unit 15 acquires vehicle state data from an electronic control unit or the like of the vehicle 100 to which the mobile terminal 10 is connected via a cable or the like. Further, the vehicle state acquisition unit 15 can acquire the position information from GPS module G and acquire the vehicle speed V of the vehicle 100 based on the acquired position information. The arithmetic processing unit 16 executes analysis processing of the time-axis data of the sound acquired by the sound acquisition unit 14. The extraction unit 17 performs, for example, narrowing down an analysis result by the arithmetic processing unit 16 in accordance with the operator's selection or the like. The display control unit 18 controls the display unit 11.

The server 20 of the abnormal noise diagnostic system 1 is a computer (information processing device) including a CPU, ROM, RAM, an input/output device, a communication module, and the like, and is installed and managed by, for example, an automobile manufacturer who manufactures the vehicle 100. In the server 20, an abnormal noise diagnosis unit 21 as a diagnostic device for diagnosing abnormal noise generated in the vehicle 100 is constructed by cooperation of hardware such as a CPU and an abnormal noise diagnosis application installed in advance. The abnormal noise diagnosis unit 21 includes a neural network (convolutional neural network) constructed by supervised learning (machine learning) so as to diagnose a component that is a cause of abnormal noise generated in the vehicle 100 or a source of abnormal noise based on the interview information acquired by the mobile terminal 10, time axis data of sound, vehicle state data, and the like. Further, in the server 20, when the occurrence of a new abnormal noise in the vehicle 100 is found, the re-learning of the abnormal noise diagnosis unit 21 using the time axis data of the sound acquired for the new abnormal noise, the contents of each item of the inquiry information, and the like as the teacher data is executed.

Further, the server 20 includes a storage device 22 that stores, for each vehicle type, a database storing information about a plurality of abnormal noises found to occur in the vehicle. The database stores, in association with each of a plurality of abnormal noises, information such as time-axis data of sounds, causes of generation of abnormal noises, components serving as generation sources, contents of inquiry information provided by a user or the like, and measures for eliminating abnormal noises. Further, the server 20 updates the database based on information acquired from a large number of vehicles including the vehicle 100, information related to newly found abnormal noise transmitted from an automobile manufacturer (developer, etc.), a vehicle dealer, a maintenance factory, etc., and the like.

Next, referring to FIG. 2, an abnormal noise diagnosis process by the abnormal noise diagnostic system 1 will be described. When a worker such as a vehicle dealer or a maintenance shop is requested to eliminate abnormal noises from a user of the vehicle 100 or the like, the worker listens to the inquiry information from the user or the like, and then performs a reproduction test to acquire information necessary for diagnosis of abnormal noises. When performing the reproduction test, the worker places or fixes the mobile terminal 10 or an external microphone connected to the mobile terminal 10 at an appropriate position of the vehicle 100 without connecting the mobile terminal 10 to the electronic control device of the vehicle 100 or connecting the mobile terminal 10 to the electronic control device of the vehicle 100. In addition, the operator activates the abnormal noise diagnosis support application and turns on the start switch of the vehicle 100. Accordingly, the mobile terminal 10 acquires information such as a vehicle identification number or a vehicle carriage number of the vehicle 100 from the electronic control device. Further, the operator taps the recording start button displayed on the display unit 11, and causes the vehicle 100 to travel (operate) on the roadway or the test platform, and reproduces the traveling state in which the abnormal noise is generated based on the inquiry information from the user or the like of the vehicle 100.

While the vehicle 100 travels (operates), the sound acquisition unit 14 of the mobile terminal 10 acquires the time axis data of the sound emitted from the vehicle 100 and stores the time axis data in the auxiliary storage device M. In addition, the vehicle state acquisition unit 15 acquires the vehicle state data designated by the operator in accordance with the interview information from the electronic control unit of the vehicle 100 in synchronization with the acquisition of the time axis data of the sound by the sound acquisition unit 14, and stores the vehicle state data in the auxiliary storage device M. Further, if the mobile terminal 10 is not connected to the electronic control unit of the vehicle 100, the position information (own-vehicle position information) of the vehicle 100 is acquired at the first time interval Tp predetermined by GPS module G (e.g., approximately 0.5-1 seconds), and the acquired position information is stored in the auxiliary storage device M. Then, when the operator taps the recording stop button displayed on the display unit 11, the acquiring of the time-axis data of the sound, the vehicle-state data, and the like is completed, and the mobile terminal 10 executes a series of processes shown in FIG. 2. In addition, when the mobile terminal 10 is not connected to the electronic control unit of the vehicle 100, the vehicle state acquisition unit 15 of the mobile terminal 10 acquires (estimates) the vehicle speed V of the vehicle 100 based on the position information acquired by GPS module G after the recording stop button is tapped and prior to starting the process shown in FIG. 2.

As shown in FIG. 2, after completion of the reproduction test, the arithmetic processing unit 16 of the mobile terminal 10 acquires the time-axis data of the sound acquired by the sound acquisition unit 14 (S100), performs Short-Time Fourier Transform (STFT) on the acquired time-axis data of the sound, and acquires a spectrogram (sound spectrogram) indicating the relation between the time, the frequency, and the sound pressure (S110). Further, the display control unit 18 of the mobile terminal 10 causes the display unit 11 to display the spectrogram acquired by the arithmetic processing unit 16 (S120). The spectrogram is a color map showing the relationship between the time and the sound pressure level for each frequency by color-dividing the sound pressure level with the horizontal axis as the time axis and the vertical axis as the frequency axis.

When the spectrogram is displayed on the display unit 11 of the mobile terminal 10, the operator selects (designates) a range (hereinafter, referred to as "diagnosis range") to be diagnosed (analyzed) by the abnormal noise diagnosis unit 21 (server 20) in the spectrogram on the display unit 11. In response to the operator's screen-operation, the extraction unit 17 acquires the diagnosis range selected by the operator, and gives an instruction to the display control unit 18 to display the diagnosis range on the display unit 11 (S130). Further, the extraction unit 17 reads out the vehicle state data (including the vehicle speed V acquired based on the position information) within the diagnosis range (S140), and extracts the information to be provided to the servers 20 as the inquiry information from the read out vehicle state data (S150).

After S150 process, the display control unit 18 causes the display unit 11 to display a message instructing the input of the interview information, and the inquiry information acquisition unit 13 determines the information extracted by S150 and the information input by the operator as the final interview information after the input of the interview information by the operator is completed (S160). When the inquiry information is confirmed and the operator taps the information transmitting button displayed on the display unit 11, information required for diagnosing abnormal noise is transmitted from the communication module 12 of the mobile terminal 10 to the server 20 (S170). In the present embodiment, the information transmitted from the mobile terminal 10 to the server 20 includes at least the time axis data of the sound, the inquiry information, the vehicle state data, and the information defining the diagnosis range selected by the operator.

When information necessary for diagnosis of abnormal noise is transmitted from the mobile terminal 10 to the server 20, the abnormal noise diagnosis unit 21 of the server 20 diagnoses the cause of the abnormal noise generated in the vehicle 100 based on the information given from the mobile terminal 10, and transmits the diagnosis result to the mobile terminal 10. The diagnosis result includes a cause of abnormal noise generated in the vehicle 100, a component that is a generation source of abnormal noise, and a measure for eliminating the abnormal noise read from the storage device 22. Then, when the diagnosis result from the servers 20 is received by the mobile terminal 10 (S180), the diagnosis result is displayed on the display unit 11 (S190), and a series of processes executed by the mobile terminal 10 is completed at the time of diagnosis of abnormal noise. By executing the process shown in FIG. 2, the operator can accurately explain the diagnosis result from the servers 20 to the user of the vehicles 100 or the like, and promptly proceed with the abnormal noise countermeasure.

Figure 3:
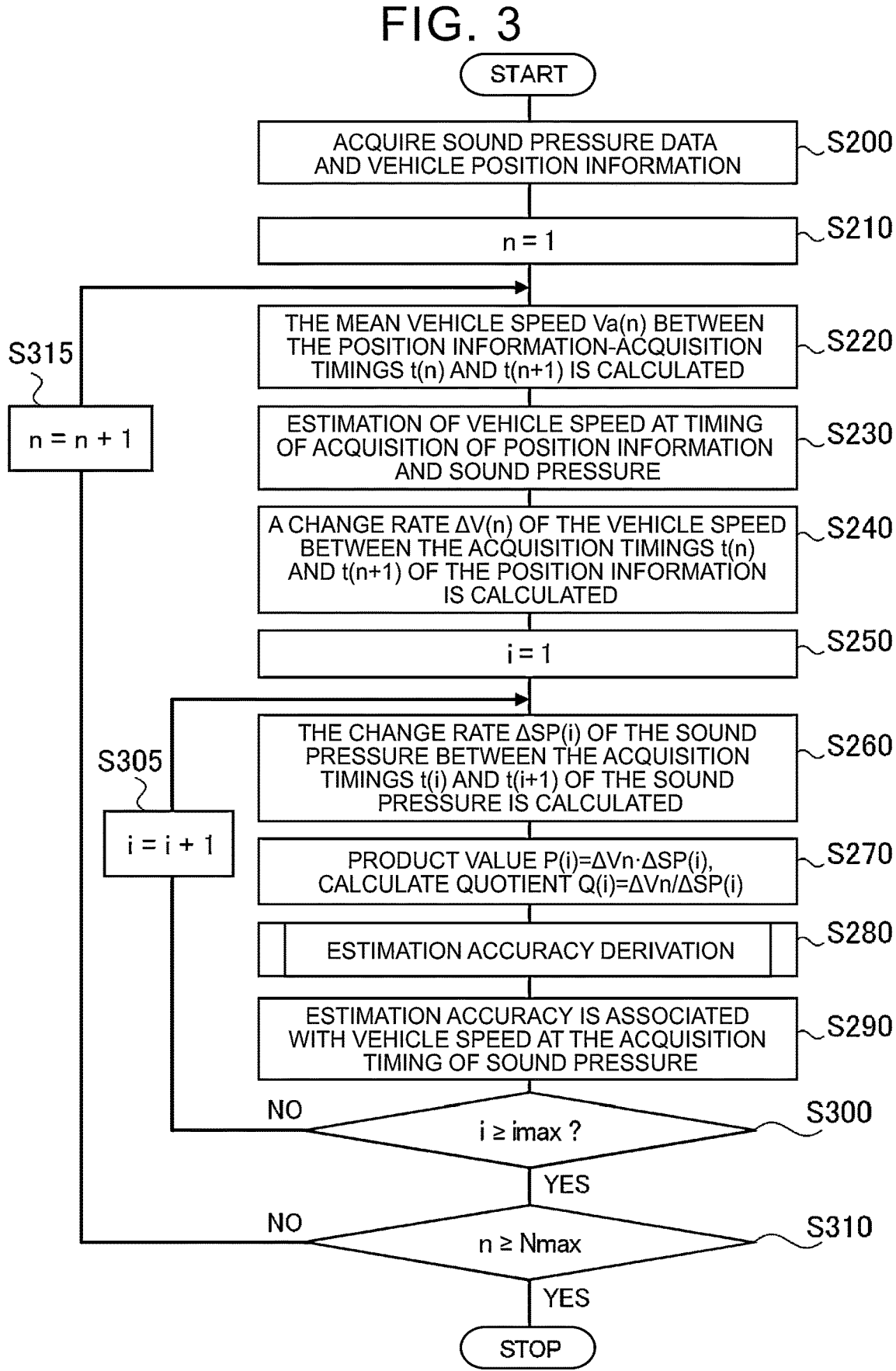
FIG. 3 is a flowchart for explaining a procedure for acquiring a vehicle speed of a vehicle by a mobile terminal constituting the abnormal noise diagnostic system of the present disclosure.

FIG. 3 is a flow chart showing a routine executed by the vehicle state acquisition unit 15 of the mobile terminal 10 to acquire the vehicle speed V based on the position information of the vehicle 100 acquired while the reproduction test is performed.

When acquiring the vehicle speed V (unit: km/h) from the position information of the vehicle 100, the vehicle state acquisition unit 15 of the mobile terminal 10 first acquires the position information (the own vehicle position information) of the vehicle 100 acquired by GPS module G in the first time interval Tp while the reproduction test is performed, and the data of the sound pressure extracted from the time axis data of the sound acquired while the reproduction test is performed (S200). The sound pressure is an overall value (in Pascals) extracted by the sound acquisition unit 14 or the arithmetic processing unit 16 every predetermined second time interval Ts (for example, about several msec—50 msec) shorter than the first time interval Tp from the time axis data of the sound after completion of the reproduction test. However, the sound pressure acquired by S200 may be a partial all-value or may be represented by a common logarithm.

In addition, the vehicle state acquisition unit 15 sets the variable n indicating the acquisition order of the position information to "1" (S210), and then calculates the mean vehicle speed Va(n) of the vehicle 100 between the acquisition timing tp(n) and tp(n+1) of the position information on the basis of the n-th and n+1-th position information acquired in S200 and the first time interval Tp (S220). In S220, the vehicle state acquisition unit 15 calculates the moving distance of the vehicle 100 between the acquisition timing tp(n) and tp(n+1) of the position information from the n-th and n+1-th position information, and calculates the mean vehicle speed Va(n) by dividing the calculated moving distance by the first time interval Tp.

Figures 4, 5:
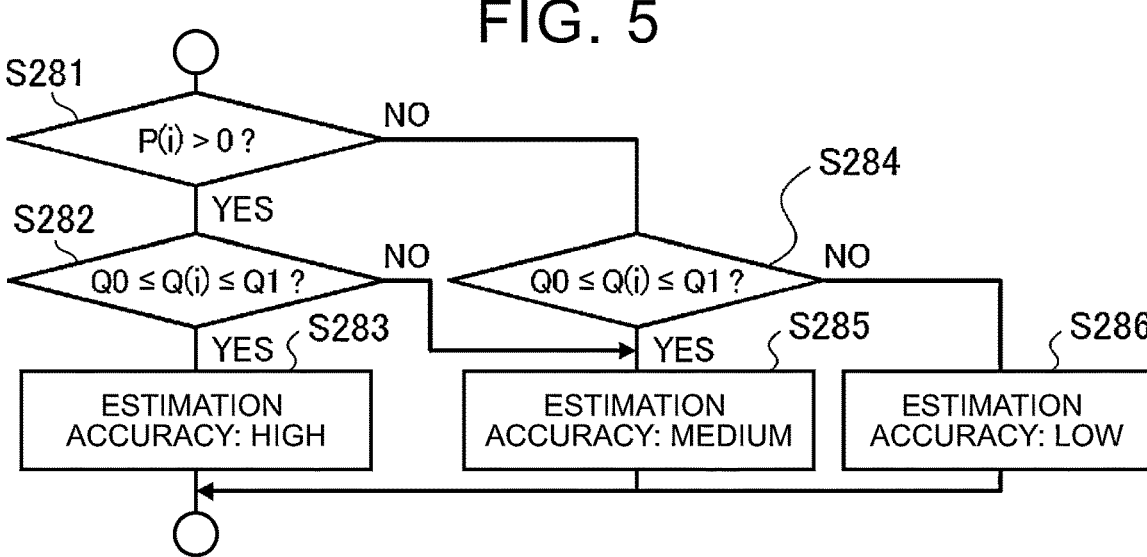
FIG. 4 is a time chart for explaining a process of acquiring a vehicle speed of a vehicle by a mobile terminal constituting the abnormal noise diagnostic system of the present disclosure.
FIG. 5 is a flowchart for explaining a derivation procedure of the estimation accuracy of the vehicle speed by the mobile terminal constituting the abnormal noise diagnostic system of the present disclosure.

Subsequently, the vehicle state acquisition unit 15 estimates the acquisition timing tp(n) and tp(n+1) of the position information and the vehicle speed V at the acquisition timing ts(i) of the sound pressure included between the acquisition timings tp(n) and tp(n+1) (where the variable i indicates the acquisition order of the sound pressure between the acquisition timings tp(n) and tp(n+1) of the position information), and stores the estimation order in the auxiliary storage device M (S230). In the present embodiment, as shown in FIG. 4, the vehicle state acquisition unit 15 assumes that the vehicle 100 travels between the acquisition timing tp(n) and tp(n+1) of the position information at an equal acceleration, and calculates the acceleration between the acquisition timing tp(n) and tp(n+1) based on the mean vehicle speed Va(n) and the vehicle speed at the acquisition timing tp(n) (the vehicle speed at the acquisition timing tp(n+1) at the time of the previous execution of S230). Further, the vehicle state acquisition unit 15 estimates the vehicle speed V at the acquisition timing tp(n) and tp(n+1) of the position information and the vehicle speed V at the acquisition timing ts(i) of the sound pressure included between the acquisition timing tp(n) and tp(n+1) from the calculated acceleration, the mean vehicle speed Va(n), and the first and second time intervals Tp, Ts. Note that the initial speed at the time of starting acquisition of the position information required to calculate the accelerations between the position information acquisition timing tp (1) and tp (2) (the vehicle speed at the time tp1 in FIG. 4) can be calculated from the mean vehicle speed Va (1), Va (2), Va (3) and the first time interval Tp. Further, in the example shown in FIG. 4, the acquisition timing tp(n) and tp(n+1) of the position information coincide with the acquisition timing of the sound pressure, but they may not coincide with each other.

Further, the vehicle state acquisition unit 15 calculates a change rate ΔV(n) of the vehicle speed V between the acquisition timing tp(n) and tp(n+1) of the position information (S240). In S240, the vehicle state acquisition unit 15 calculates the change rate ΔV(n) of the vehicle speed V by subtracting the vehicle speed V at the acquisition timing tp(n) of the position information estimated by S230 from the vehicle speed V at the acquisition timing tp(n+1) of the position information estimated by S230 and dividing the obtained difference by the first time interval Tp. In addition, the vehicle state acquisition unit 15 sets the variable i to "1" (S250), and then calculates the change rate ΔSP(i) of the sound pressure between the acquisition timings ts(i) and ts(i+1) (S260). In S260, the vehicle state acquisition unit 15 calculates the change rate ΔSP(i) of the sound pressure by subtracting the sound pressure at the acquisition timing ts(i) from the sound pressure at the acquisition timing ts(i+1) and dividing the obtained difference by the second time interval Ts.

After S260 process, the vehicle state acquisition unit 15 calculates a quotient Q(i) obtained by dividing the product value P(i) of the change rate ΔV(n) of the vehicle speed V calculated by S240 and the change rate ΔSP(i) of the sound pressure calculated by S260 and the change rate ΔV(n) of the vehicle speed V calculated by S240 by the change rate ΔSP(i) of the sound pressure calculated by S260 (S270).

Further, the vehicle state acquisition unit 15 derives the estimation accuracy of the vehicle speed V at the acquisition timing ts(i) of the sound pressure estimated by S230 based on the product value P(i) and the quotient Q(i) calculated by S270 (S280).

As shown in FIG. 5, when deriving the estimation accuracy of the vehicle speed V, the vehicle state acquisition unit 15 determines whether or not the product value P(i) is a positive value (S281). When the product value P(i) is a positive value (S281: YES), the vehicle state acquisition unit 15 determines whether or not the quotient Q(i) is equal to or greater than a predetermined lower limit value Q0 and equal to or less than a predetermined upper limit value Q1 (S282). The lower limit value Q0 and the upper limit value Q1 are predetermined through experimental analysis. When the quotient Q(i) is included in the range from the lower limit value Q0 to the upper limit value Q1 (S282:YES), the vehicle state acquisition unit 15 sets "high" indicating that the accuracy is high in the estimation accuracy of the vehicle speed V at the acquisition timing ts(i) of the sound pressure estimated by S230 (S283).

On the other hand, even if the product value P(i) is a positive value, if the quotient Q(i) is not included in the range from the lower limit value Q0 to the upper limit value Q1 (S282:NO), the vehicle state acquisition unit 15 sets "medium" indicating that the accuracy is moderate to the estimation accuracy of the vehicle speed V at the acquisition timing ts(i) of the sound pressure estimated by S230 (S285). When the product value P(i) is not a positive value (S281: NO), the vehicle state acquisition unit 15 determines whether or not the quotient Q(i) is equal to or greater than the lower limit value Q0 and equal to or less than the upper limit value Q1 (S284). When the quotient Q(i) is included within the range from the lower limit value Q0 to the upper limit value Q1 (S284:YES), the vehicle state acquisition unit 15 sets "medium" indicating that the accuracy is moderate to the estimation accuracy of the vehicle speed V at the acquisition timing ts(i) of the sound pressure estimated by S230 (S285). Further, when the quotient Q(i) is not included in the range from the lower limit value Q0 to the upper limit value Q1 (S284:NO), the vehicle state acquisition unit 15 sets "low" indicating that the accuracy is low to the estimation accuracy of the vehicle speed V at the acquisition timing ts(i) of the sound pressure estimated by S230 (S286).

That is, when the vehicle 100 is accelerating, the change rate ΔV(n) of the vehicle speed V becomes a positive value, and the change rate ΔSP(i) of the sound pressure becomes a positive value due to an increase in the sound pressure of the sound generated in the vehicle 100. Therefore, when the vehicle 100 is accelerating, the product value P(i) of the change rate ΔV(n) of the vehicle speed V and the change rate ΔSP(i) of the sound pressure becomes a positive value. Further, when the vehicle 100 is accelerating, the quotient Q(i) obtained by dividing the change rate ΔV(n) of the vehicle speed V by the change rate ΔSP(i) of the sound pressure becomes a positive value, and if the vehicle speed V at the sound pressure acquiring timing ts(i) is accurately estimated by S230, the quotient Q(i) is included within a range from the predetermined lower limit value Q0 to the upper limit value Q1.

On the other hand, when the vehicle 100 is decelerating, the change rate ΔV(n) of the vehicle speed V becomes a negative value, and the change rate ΔSP(i) of the sound pressure becomes a negative value due to a decrease in the sound pressure of the sound generated in the vehicle 100. Therefore, even when the vehicle 100 is decelerating, the product value P(i) becomes a positive value. Further, even when the vehicle 100 is decelerating, the quotient Q(i) becomes a positive value, and if the vehicle speed V at the sound pressure acquiring timing ts(i) is accurately estimated by S230, the quotient Q(i) is included within a range from the predetermined lower limit value Q0 to the upper limit value Q1. Accordingly, when the product value P(i) is a positive value (S281:YES) and the quotient Q(i) is included within the range from the lower limit value Q0 to the upper limit value Q1 (S282:YES), it can be considered that the vehicle speed V at the sound pressure acquiring timing ts(i) is accurately estimated by S230 (S283).

Further, although the change rate ΔV(n) of the vehicle speed V is a positive value and the vehicle 100 is found to be accelerating, when the sound pressure is decreasing (for example, between the time tp2 and the time tp3 in FIG. 4) or when the change rate ΔV(n) of the vehicle speed V is found to be a negative value and the vehicle 100 is found to be decelerating, when the sound pressure is increased, there is a possibility that the vehicle speed V at the sound pressure acquiring timing ts(i) is not accurately estimated by S230. Therefore, when the product value P(i) is a positive value (S281:YES) and the quotient Q(i) is not included in the range from the lower limit value Q0 to the upper limit value Q1 (S282:NO), and when the product value P(i) is not a positive value (S281:NO) and the quotient Q(i) is included in the range from the lower limit value Q0 to the upper limit value Q1 (S284:YES), it can be considered that the vehicle speed V in the sound pressure acquiring timing ts(i) in S230 is estimated with accuracy (moderate accuracy) that is not so high (S285). Then, when the product value P(i) is not a positive value (S281:NO) and the quotient Q(i) is not included in the range from the lower limit value Q0 to the upper limit value Q1 (S284:NO), it can be considered that the estimation accuracy of the vehicle speed V at the acquisition timing ts(i) of the sound pressure estimated by S230 is low (S286).

When the estimation accuracy of the vehicle speed V is derived by S280, that is, S283,S285 or S286, the vehicle state acquisition unit 15 stores the information indicating the derived estimation accuracy in the auxiliary storage device M in association with the vehicle speed V at the acquisition timing ts(i) of the sound pressure estimated by S230 (S290). Further, the vehicle state acquisition unit 15 determines whether or not the variable i is equal to or greater than the total number Imax of the acquisition timing ts(i) of the sound pressure included between the acquisition timing tp(n) and tp(n+1) of the position information (S300). When the variable i is less than the total number Imax (S300:NO), the vehicle state acquisition unit 15 increments the variable i (S305) and then executes S260-S300 process again.

When the variable i is equal to or larger than the total number Imax (S300:YES), the vehicle state acquisition unit 15 determines whether or not the variable n is equal to or larger than the total number N max of the position information acquired by GPS module G (S310). When the variable n is less than the total number N max (S310:NO), the vehicle-state acquisition unit 15 increments the variable n (S315) and then executes the processes after S220 again. Then, when the variable n becomes equal to or larger than the total number N max (S310: YES), the vehicle state acquisition unit 15 ends the routine of FIG. 3, thereby completing the estimation of the vehicle speed V based on the position information.

As described above, when acquiring the vehicle speed V of the vehicle 100 based on the position information, the vehicle state acquisition unit 15 of the mobile terminal 10 configuring the abnormal noise diagnostic system 1 acquires the position information of the vehicle 100 acquired by GPS module G in the first time interval Tp while the reproduction test is performed, and the data of the sound pressure extracted (acquired) in the second time interval Ts from the time axis data of the sound acquired while the reproduction test is performed (S200). Further, the vehicle state acquisition unit 15 as the vehicle speed estimation unit estimates the vehicle speed V at the acquisition timing tp(n) and tp(n+1) of the position information and the vehicle speed V at the acquisition timing ts(i) of the sound pressure included between the acquisition timing tp(n) and tp(n+1) based on the acquired position information and the first and second time intervals Tp,Ts (S220,S230).

Further, the vehicle state acquisition unit 15 as the vehicle speed change rate acquisition unit acquires the change rate ΔV(n) of the vehicle speed V between the acquisition timing tp(n) and tp(n+1) of the position information on the basis of the vehicle speed V at the estimated acquisition timing tp(n) and tp(n+1) and the first time interval Tp (S240). Further, the vehicle state acquisition unit 15 as the sound pressure change rate acquisition unit calculates a change rate ΔSP(i) of the sound pressure between the acquisition timings ts(i) and ts(i+1) of the sound pressure on the basis of the acquired sound pressure and the second time interval Ts (S260). Then, the vehicle state acquisition unit 15 as the estimation accuracy acquisition unit derives the estimation accuracy of the vehicle speed V in S230 based on the change rate ΔV(n) of the vehicle speed V and the change rate ΔSP(i) of the sound pressure (S280, S281-S286), and associates the derived estimation accuracy with the vehicle speed V at the acquisition timing ts(i) of the sound pressure estimated (S290).

That is, when the vehicle 100 is accelerating, the sound pressure of the sound generated in the vehicle 100 tends to increase, and therefore, when the sound pressure is decreasing, there is a possibility that the vehicle speed V is not accurately estimated by S230 even though the change rate ΔV(n) of the vehicle speed V is a positive value and the vehicle 100 is recognized to be accelerating. Further, when the vehicle 100 is decelerating, the sound pressure of the sound generated in the vehicle 100 tends to decrease, and therefore, there is a possibility that the vehicle speed V is not accurately estimated by S230 when the sound pressure is increasing even though the change rate ΔV(n) of the vehicle speed V is a negative value and the vehicle 100 is found to be decelerating.

Therefore, it is possible to derive the estimation accuracy of the vehicle speed V estimated by S230 from the change rate ΔV(n) of the vehicle speed V and the change rate ΔSP(i) of the sound pressure as appropriate reflecting the actual condition. Then, by associating the estimation accuracy derived from the change rate ΔV(n) of the vehicle speed V and the change rate ΔSP(i) of the sound pressure with the vehicle speed V in the acquisition timing ts(i) of the sound pressure estimated by S230, the data of the usable vehicle speed V can be acquired from the position information of the vehicle 100 and the data of the sound generated in the vehicle 100. As a result, in the mobile terminal 10, in order to acquire the vehicle speed V based on the position information of the vehicle 100, it is not necessary to extract the characteristic information of the sound or to generate, classify, or store the information for estimating the vehicle speed associated with the characteristic information of the sound.

Further, when the product value P(i) of the change rate ΔV(n) of the vehicle speed V and the change rate ΔSP(i) of the sound pressure is a positive value (S281:YES) and the quotient Q(i) obtained by dividing the change rate ΔV(n) of the vehicle speed V by the change rate ΔSP(i) of the sound pressure is included within a predetermined range Q0-Q1 (S282:YES), the vehicle state acquisition unit 15 as the estimation accuracy acquisition unit associates information indicating that the estimation accuracy is high with the vehicle speed V at the acquisition timing ts(i) of the sound pressure estimated by S230 (S283,S290). Further, when the product value P(i) is a positive value (S281:YES) and the quotient Q(i) is not included in the range Qo-Q1 (S282:NO), and when the product value P(i) is not included in the positive value (S281:NO) and the quotient Q(i) is included in the range Q0-Q1 (S284:YES), the vehicle state acquisition unit 15 associates information indicating that the estimation accuracy is moderate with the vehicle speed V at the acquisition timing ts(i) of the sound pressure estimated by S230 (S285,S290). In addition, when the product value P(i) is not a positive value (S281:NO) and the quotient Q(i) is not included in the range Q0-Q1 (S284:NO), the vehicle state acquisition unit 15 associates information indicating that the estimation accuracy is low with the vehicle speed V at the acquisition timing ts(i) of the sound pressure estimated by S230 (S286,S290).

Accordingly, the estimation accuracy information associated with the vehicle speed V estimated by S230 can be appropriately reflected in the actual condition. However, the process of S282 in of FIG. 5 may be omitted, and when the product value P(i) is a positive value (S281:YES) and the quotient Q(i) is included in the range Q0-Q1 (S284:YES), the information indicating that the estimation accuracy is high may be associated with the vehicle speed V at the sound pressure acquisition timing ts(i) estimated by S230.

Further, in the abnormal noise diagnostic system 1, when the mobile terminal 10 is arranged at an appropriate position of the vehicle 100 and the vehicle 100 is caused to travel, the mobile terminal 10 can synchronously acquire the data of the sound emitted from the vehicle 100 and the vehicle speed V of the vehicle 100 based on the position information without connecting the mobile terminal 10 to the vehicle speed sensor or the like of the vehicle 100. In addition, the abnormal noise diagnosis unit 21 of the server 20 constituting the abnormal noise diagnostic system 1 can select the vehicle speed V to be used for diagnosis of abnormal noise based on the estimation accuracy associated with the vehicle speed V estimated by the mobile terminal 10 when diagnosing the abnormal noise generated in the vehicle 100 based on the data of the vehicle speed V based on the sound and the position information transmitted from the mobile terminal 10. For example, the vehicle speed V with low estimation accuracy and the sound pressure corresponding to the vehicle speed V can be excluded from the diagnosis target of the abnormal noise. As a result, the abnormal noise can be diagnosed by the abnormal noise diagnosis unit 21 based on the vehicle speed V accurately estimated from the positional information of the vehicle 100, so that the diagnostic accuracy of the abnormal noise can be further improved.

Note that the quotient Q(i) calculated by S270 of FIG. 3 may be obtained by dividing the change rate $\Delta SP(i)$ of the sound pressure by the change rate $\Delta V(n)$ of the vehicle speed V. Furthermore, the steps of estimating the vehicle speed V at the acquisition timing ts(i) of the sound pressure included between the acquisition timings tp(n) and tp(n+1) of the position information in S230 and the acquisition timings tp(n) and tp(n+1) are not limited to those described above. That is, in S230, the vehicle speed V may be estimated by any estimation method based on the position information in the acquired timing tp(n) and tp(n+1) and the first and second time intervals Tp, Ts. Further, the routine shown in FIG. 3 and FIG. 4 may be executed in real time when the time-axis data of the sound is acquired by the reproduction test, or may be executed by the abnormal noise diagnosis unit 21 of the server 20 after the reproduction test.

It is needless to say that the disclosure of the present disclosure is not limited to the above-described embodiments, and various modifications can be made within the scope of the extension of the present disclosure. Furthermore, the above-described embodiment is only a specific form of the disclosure described in the column of the outline of the disclosure, and does not limit the elements of the disclosure described in the column of the outline of the disclosure.

The disclosure of the present disclosure can be used in a vehicle manufacturing industry and the like.

What is claimed is:

1. A vehicle speed acquisition device that acquires a vehicle speed of a vehicle based on position information of the vehicle, the vehicle speed acquisition device comprising:
   a GPS sensor configured to acquire the position information at a first time interval that is determined in advance;
   a microphone configured to acquire a sound pressure of sound emitted from the vehicle at a second time interval that is shorter than the first time interval; and
   a processor programmed to:
   estimate the vehicle speed at an acquisition timing of the position information and the vehicle speed at an acquisition timing of the sound pressure, based on the position information and the first and the second time intervals;
   acquire a change rate of the vehicle speed between acquisition timings of the position information, based on the vehicle speed at the acquisition timing of the position information that is estimated, and the first time interval;
   acquire a change rate of the sound pressure between acquisition timings of the sound pressure, based on the sound pressure that is acquired, and the second time interval; and
   acquire an estimation accuracy of the vehicle speed, based on the change rate of the vehicle speed and the change rate of the sound pressure, and associating the estimation accuracy that is acquired, with the vehicle speed at the acquisition timing of the sound pressure that is estimated.

2. The vehicle speed acquisition device according to claim 1, wherein the processor is programmed to associate information, indicating that the estimation accuracy is high, with the vehicle speed at the acquisition timing of the sound pressure that is estimated, when a product value of the change rate of the vehicle speed and the change rate of the sound pressure is a positive value.

3. The vehicle speed acquisition device according to claim 1, wherein the processor is programmed to associate information, indicating that the estimation accuracy is high, with the vehicle speed at the acquisition timing of the sound pressure that is estimated, when a quotient obtained by dividing one of the change rate of the vehicle speed and the change rate of the sound pressure by another one of the change rate of the vehicle speed and the change rate of the sound pressure is included within a range that is determined in advance.

4. The vehicle speed acquisition device according to claim 1, wherein the processor associates information, indicating that the estimation accuracy is high, with the vehicle speed at the acquisition timing of the sound pressure estimated by the processor, when a product value of the change rate of the vehicle speed and the change rate of the sound pressure is a positive value, and a quotient obtained by dividing one of the change rate of the vehicle speed and the change rate of the sound pressure by another one of the change rate of the vehicle speed and the change rate of the sound pressure is included within a range that is determined in advance, associates information, indicating that the estimation accuracy is moderate, with the vehicle speed at the acquisition timing of the sound pressure estimated by the processor, when the product value is a positive value and the quotient is not included within the range, or the product value is not a positive value and the quotient is included within the range, and associates information, indicating that the estimation accuracy is low, with the vehicle speed at the acquisition timing of the sound pressure estimated by the processor, when the product value is not a positive value and the quotient is not included within the range.

5. An abnormal noise diagnostic system, comprising: the vehicle speed acquisition device according to claim 1;

a mobile terminal that is configured to acquire the position information and data regarding the sound emitted from the vehicle, and that also includes the vehicle speed acquisition device; and a diagnostic device that is built by machine learning, so as to diagnose an abnormal noise occurring in the vehicle, based on the data of the sound transmitted from the mobile terminal, and the vehicle speed acquired by the vehicle speed acquisition device, wherein the diagnostic device selects the vehicle speed to be used for diagnosis of the abnormal noise, based on the estimation accuracy associated with the vehicle speed from the mobile terminal.

* * * * *